(12) United States Patent
Bauernschmitt

(10) Patent No.: US 11,240,989 B2
(45) Date of Patent: Feb. 8, 2022

(54) ELECTRIC MUCK-OUT FORK

(71) Applicant: VEBATO GmbH, Waischenfeld (DE)

(72) Inventor: Anton Bauernschmitt, Waischenfeld (DE)

(73) Assignee: VEBATO GmbH, Waischenfeld (DE)

( * ) Notice: Subject to any disclaimer, the term of this patent is extended or adjusted under 35 U.S.C. 154(b) by 0 days.

(21) Appl. No.: 16/641,069

(22) PCT Filed: Aug. 23, 2017

(86) PCT No.: PCT/IB2017/000999
§ 371 (c)(1),
(2) Date: Feb. 21, 2020

(87) PCT Pub. No.: WO2019/038572
PCT Pub. Date: Feb. 28, 2019

(65) Prior Publication Data
US 2021/0029961 A1    Feb. 4, 2021

(51) Int. Cl.
*A01K 1/01*     (2006.01)
*A01D 9/00*    (2006.01)

(52) U.S. Cl.
CPC . *A01K 1/01* (2013.01); *A01D 9/00* (2013.01)

(58) Field of Classification Search
CPC . A01K 1/01; A01D 9/00; A01D 11/02; B25G 3/02

USPC ............................................. 294/55.5, 57, 59
See application file for complete search history.

(56) References Cited

U.S. PATENT DOCUMENTS

| 1,274,927 | A | * | 8/1918 | Moon | E02F 3/205 |
| | | | | | 37/189 |
| 4,574,735 | A | | 3/1986 | Hohenstein | |
| 6,022,058 | A | * | 2/2000 | O'Rourke | A01K 1/0114 |
| | | | | | 209/418 |
| 6,328,361 | B1 | * | 12/2001 | Spear | A01B 1/20 |
| | | | | | 294/57 |
| 2005/0045350 | A1 | | 3/2005 | Roberson et al. | |
| 2007/0222242 | A1 | | 9/2007 | Daniels | |
| 2011/0209456 | A1 | | 9/2011 | Berto | |

FOREIGN PATENT DOCUMENTS

| DE | 10 2005 036 391 | 1/2007 |
| WO | WO9314687 | 8/1993 |

\* cited by examiner

*Primary Examiner* — Dean J Kramer
(74) *Attorney, Agent, or Firm* — Pandiscio & Pandiscio

(57) ABSTRACT

The invention relates to a fork (1) for collecting animal excrement, in particular horse droppings, comprising a handle (2) and a plurality of tines (3), which, after activation of an electromechanical actuation element (4), can be set into rapid vibration by a vibration device (5) arranged in the handle (2) so as to separate the animal excrement from shavings and other bedding material. The electromechanical actuation element (4) is mechanically and/or electrically decoupled from the vibration device (5).

21 Claims, 4 Drawing Sheets

ELECTRIC MUCK-OUT FORK

REFERENCE TO PENDING PRIOR PATENT APPLICATION

This patent application claims benefit of International (PCT) Patent Application No. PCT/IB2017/000999, filed 23 Aug. 2017 by VEBATO GmbH for ELECTRIC MUCK-OUT FORK, which patent application is hereby incorporated herein by reference.

FIELD OF THE INVENTION

The invention relates to a fork for collecting animal excrement, in particular horse droppings, comprising a handle and a plurality of tines, which, after activation of an electromechanical actuation element, can be set into rapid vibration by a vibration device arranged in the handle so as to separate the animal excrement from shavings and other bedding material.

BACKGROUND OF THE INVENTION

Such a fork is described in Patent Specification DE 10 2005 036 391 B4, the holder of which is the applicant of the application at hand. On the one hand, good results can certainly be achieved therewith; on the other hand, however, it has been shown in practice that this fork still needs some improvement. Since both the switching mechanism as well as the vibration device are arranged in the same handle and moreover both carry the same current, it can cause problems for the contact tongues of the switching mechanism in terms of maintaining a reliable contact during the vibration phase. In fact, the contact tongues also start to vibrate, which can result in brief contact interruptions, which are always accompanied by a momentary electric arc. Even though this does not disrupt the flow of current, soot builds up on the contact tongues and it does not take long until it is no longer possible to reliably establish a contact anymore.

SUMMARY OF THE INVENTION

The disadvantages of the described prior art resulted in the problem which initiated the invention of developing a fork of the type in question for collecting animal excrement such that the electromechanical actuation element has a longest possible operating time during which reliable contact-making and interruption is guaranteed.

The solution to this problem is achieved in that the electromechanical actuation element is mechanically and/or electrically directly decoupled from the vibration device in such a way that, if necessary, an indirect, i.e., non-direct, mechanical and/or electrical coupling is present.

Such an indirect coupling would be provided, for example, via a damping element, which allows mechanical vibrations or electrical switch-on/switch-off pulses coming from the vibration device to pass through to the electromechanical switch only to the damped extent, and/or, for example, via another decoupling device. For this purpose, an amplifier, for example, could also be used as the electric decoupling device, with an actuator coupled to the output connections of said amplifier, while the electromechanical actuation element is attached to the input thereof, wherein the spikes occurring at the output are reduced only by the inverse amplification factor 1/A of the amplifier or reach the input to a lesser extent.

It has proven to be beneficial that the vibration device is driven by an electric actuator, in particular by an electric motor. An electric drive requires less design effort than a hydraulic drive for example.

In this case, it is advantageous that the activation current of the electric actuator does not flow through the electromechanical actuation element. This type of decoupling is used to protect the actuation element from current and voltage peaks, like those that can occur in particular during switch-on and/or switch-off.

The activation current of the electric actuator can in fact flow through a contactless, electronic switch element, which for the actuation thereof is electrically coupled to the electromechanical actuation element. The advantage of an electronic switch element is that no mechanical contacts whatsoever are present, which could lose their mechanical stability or even get damaged from powerful vibrations during shaking. An electronic switch element, i.e., for example, a transistor, thyristor, triac, operational amplifier or the like, does not have such limitations.

Within the context of a preferred design, the electromechanical switch element is not arranged on the handle itself, rather only indirectly connected therewith, i.e., non-directly. This is also a measure to keep mechanical vibrations away from the electromechanical actuation element.

The invention recommends arranging the electromechanical switch element on a grip connected to the upper end of the handle. This allows various positive effects to be utilized. On the one hand, the switch element there is already at a maximum distance from the source of the vibrations, i.e., the vibration device, just because of the length of the handle. On the other hand, there is an interface between the handle and the grip, in that those two parts are not integrated with one another, and a further damping of the vibrations can be undertaken at said interface.

In pursuit of this inventive idea, the invention provides for the grip to be plugged together as well as fixed, as the case may be, with the upper end of the handle. Because of such a plug connection, the grip and the handle have a smaller contact surface than would with be the case, for example, if the grip and the tube were screwed together. The smaller the contact surface is, the lower the transmission of vibrations from the handle to the grip.

This effect can be further supported in that, the mating surfaces facing each other of one or both plug elements are respectively provided with one or a plurality of projections so that only said projections make contact with the other plug element. Due to the fact that the remaining area between the projections is recessed from the opposing mating surface, there is no contact there, rather only on the projections themselves. As a result, the transmission of vibrations is further minimized.

It has been proven to provide a plurality of projections on the inner side of a plug-in sleeve arranged on the grip, which projections make contact with the related surface of the handle, and/or vice versa. If the plug-in sleeve of the grip is engaged around the handle outwardly in the manner of a skirt, the protrusions should be arranged on the inner side of said skirt or plug-in sleeve. Otherwise, i.e., if a plug connection of the grip engages in the hollow tube of the handle, the protrusions would have to be arranged on the outer circumference of the plug connection. Because the grip is normally manufactured as an injection molded part of plastic, and, most of the time, the handle consists of a metal tube, these types of protrusions can be formed more easily on the grip than on the handle.

These types of projections can be configured as elongated protrusions, in particular with a longitudinal axis parallel to the longitudinal axis of the handle. As a result, said protrusions do not interfere when the grip is being demolded. On the other hand, sufficient numbers of protrusions of this sort can be arranged in a distributed manner around the circumference of the plug-in sleeve or of the plug connection, preferably at least three protrusions each offset by 120°, better at least four protrusions each shifted by 90°, even better, for example, six protrusions each offset by 60°, so that, a precise and wobble-free guidance of the grip on the handle can be achieved despite the low physical contact.

The grip that can be fit together, in particular plugged together, with the handle can have an, in itself elongated, bar-shaped gripping region running transversely to the longitudinal axis of the handle. With this type of grip bar running transversely to the handle, a person working with the fork also has an optimal control over the relative turning position of the fork around the longitudinal axis of the handle. A worker is thus able to easily prevent excrement from inadvertently rolling off.

A connecting leg can be provided on one or preferably both ends of the bar-shaped gripping region. The purpose of such connecting legs at the ends is to firmly connect the grip bar to the handle without thereby restricting the handling space for a person's hand.

The fact that the two free ends of the connecting legs that are connected to each other via the bar-shaped gripping region converge towards each other from the bar-shaped gripping region takes account of the fact that in general the diameter of the handle is substantially smaller than the length of the grip bar so that the distance between the two connecting legs near the handle should be the smallest and can increase from there towards the grip bar.

To facilitate the assembly of such a grip with the fork handle, the invention recommends that the two free ends of the connecting legs that are connected to each other via the bar-shaped gripping region are each connected on the free ends thereof with a plug connection, in particular with a plug-in sleeve. The latter is then used to fit together with the handle, which is configured in general as a round hollow tube.

Together with the two connecting legs and the plug-in sleeve, the bar-shaped gripping region forms a type of ring with a free grip opening in the center, which offers an optimal access to the grip bar.

This type of design offers the possibility of a such a further development that a moveable part of the electromechanical actuation element, which part is accessible from the outside, extends from the bar-shaped gripping region inwardly into the interior space of the annular grip, where the moveable part of the electromechanical actuation element that is accessible for an actuation is surrounded in a protective manner by the annular shape of the grip. In the event, for example, that an excrement fork according to the invention should topple over, it is hardly possible for the inwardly-directed actuation element which is arranged more within the grip to get damaged.

Furthermore, a switch element could also be adversely affected for example by moisture, and/or penetrating (dirt) particles. So as to also prevent such a negative effect, it is provided according to the invention that a moveable part of the electromechanical actuation element, which part is accessible from the outside, be surrounded in a protective manner preferably by a rubber-elastic cap. As a result, the actuation element hidden under the cap is removed from the atmospheric environment so that neither moisture nor other chemicals are able to penetrate. On the other hand, the rubber-elastic cap can be configured to be transparent so that the switch element hidden underneath is immediately visible to a person.

The invention experiences a further optimization in that the rubber-elastic cap is clamped for fixation thereof between the body of the grip and the housing of the electromechanical actuation element. On the one hand, this clamping achieves an optimal impermeability so that at this connecting point neither liquids nor particles are able to penetrate. On the other hand, the clamped edge of the rubber-elastic cap acts like a type of vibration dampening, because structure-borne noise is able to penetrate through the soft material of the rubber-elastic cap only with diminished amplitude from the grip to the housing of the switch.

Space is available inside a handle configured as a hollow tube to accommodate one or a plurality of accumulators or batteries for supplying an electric actuator of the vibration device with power. A plurality of accumulators can be coupled with each other to increase the charging capacity. In order to make sufficient voltage available for operating an actuator, the invention provides that a plurality of accumulators can be connected in series. In this case, these are preferably approximately cylindrical, approximately battery-shaped units, which can be soldered together pole to pole so that a close contact is guaranteed and a type of column is produced, which can easily be accommodated inside the handle.

In order to shield such an accumulator column and especially also the soldered connections thereof somewhat from the vibrations during shaking, such an elongated accumulator pack can be sheathed by a kind of hose so that the accumulators do not abut directly on the inner side of the handle tube.

Furthermore, one or a plurality of accumulators can be charged via a charging device, in particular via a charging device that is coupled to or can be coupled to the power supply network. As a result, self-sufficient operation is possible in the long-term, wherein the charging time generally depends on the charging capacity of the accumulators and/or on the discharge state, whereby the latter depends, in turn, on the size of a stable or the like that needs to be mucked out. In general, however a nightly charge is sufficient for the accumulator to be full in the morning so that the electric excrement fork is fully available for normal stable work.

Indeed this type of charging device could also be integrated inside the handle or the grip, which, however, is associated with the disadvantage of an increased weight so a worker might tire more readily. Therefore, according to the invention, a preferably detachable interface for connecting the accumulators to the charging device is proposed so that the excrement fork according to the invention is free of any power cord when work is being performed.

Such an interface can be configured as a plug connection, in particular as a plug socket. This means that a galvanic connection can be established for charging, which can be interrupted quickly for working with the excrement fork.

It is within the context of the invention that the plug-in device, in particular the plug socket, is arranged on the grip that can preferably be detached from the handle. There, during grip manufacturing, in particular during the injection molding process, a suitable location can be provided for incorporating a plug socket, into which the plug-in device can then be appropriately inserted.

Finally, it corresponds to the teaching of the invention that the tines of the fork consist preferably of plastic, whereas the handle of the fork consists preferably of metal. In that the mass ratio between the handle and grip, on the one hand, and the tines, on the other, is as large as possible, the light-weight tines experience a much stronger acceleration than the handle. The purpose of this is likewise to limit the vibrations in the handle during the shaking process. Generally speaking, a larger mass has a lower resonance frequency than a lighter mass, and this fact allows the vibration frequency to be adapted as precisely as possible to the higher resonance frequency of the tines so that they vibrate approximately in resonance, while the handle does not vibrate with its resonance frequency, i.e., with a considerably smaller amplitude.

BRIEF DESCRIPTION OF THE DRAWINGS

Additional features, details, advantages and effects based on the invention are yielded from the following description of a preferred embodiment of the invention as well as on the basis of the drawings, which show.

DETAILED DESCRIPTION OF THE PREFERRED EMBODIMENTS

Figure 1:
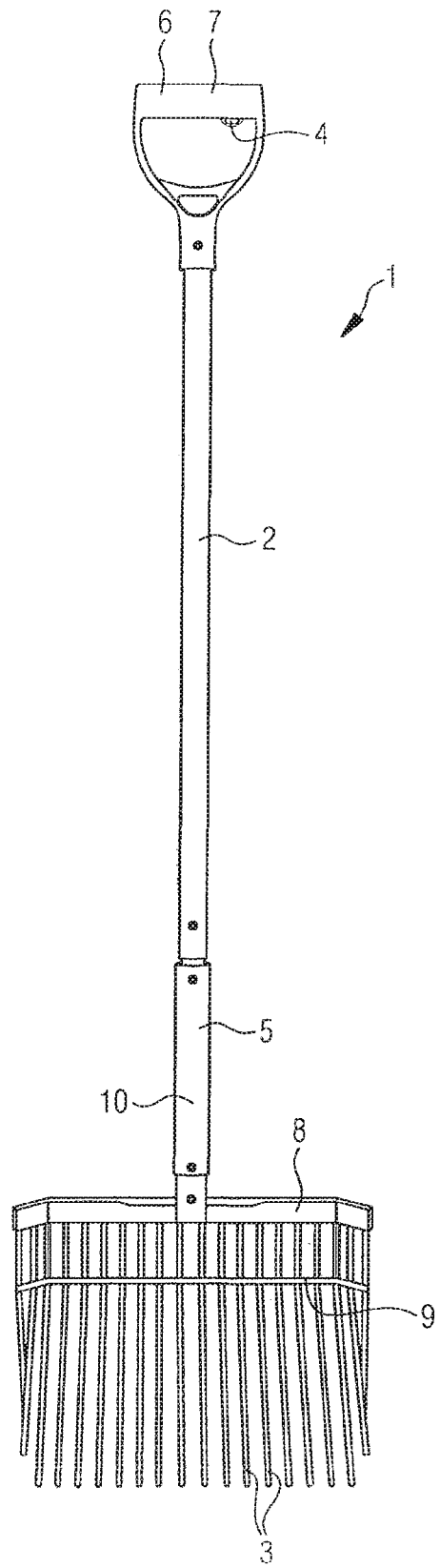
FIG. 1 A front view of an excrement fork according to the invention.

The drawing portrays an electric excrement fork 1 according to the invention, which can be used for collecting animal excrement, in particular horse droppings.

One can see an elongated handle 2, preferably with a length of 1 meter to 1.50 meter, or more. The handle 2 consists in the upper and central regions thereof preferably of a metal tube.

At the lower end of the excrement fork 1, one can see a plurality of fork tines 3. Said tines 3 preferably consist of plastic and are considerably lighter than the handle 2.

Located in the upper region of the excrement fork 1 is an electromechanical actuation element 4, which when actuated triggers the vibration process.

In the process, a vibration device 5 arranged in the handle 2 is set into rapid vibration, and therefore also the tines 3 so as to thereby separate the animal excrement from shavings and other bedding material.

Furthermore, FIG. 1 shows that a grip 6 with a grip bar 7 that runs transversely, similar to a spade, is arranged on the upper end of the handle 2.

In addition, it is possible to see that the various tines 3 are anchored with their rearward ends to a yoke 8 and are connected to each other again by an additional crosspiece 9 on this side of the yoke 8 to improve their stability. Because of the yoke 8 and the additional crosspiece 9, all the tines 3 are coupled to each other as well as collectively to the vibration device 5 so that they are able to bear a maximum vibration amplitude from said vibration device.

Additional details of the arrangement can be found in the detailed drawings following FIG. 1.

Figure 2:
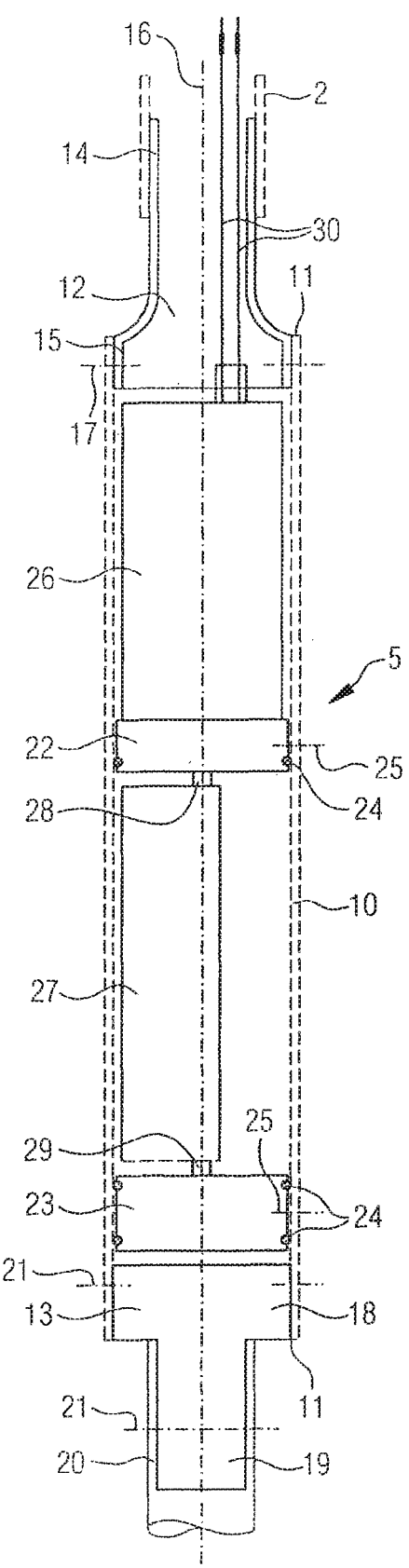
FIG. 2 An enlarged view of a longitudinal section through the vibration device of the excrement fork from FIG. 1.

The depiction in FIG. 2 is dedicated in particular to the vibration device 5:

The vibration device 5 is accommodated at the lower end of the handle 2, in for example a tubular housing 10, which is preferably extended in cross-section. An adapter 12, 13 for connection to the handle 2, on the one hand, as well as to the yoke 8 of the tines 3, on the other, is present at each of the two open end sides 11 of the housing 10 of the vibration device 5.

The adapter 12 for connecting the housing 10 of the vibration device 5 to the handle 2 comprises two ends 14, 15 having different cross-sections.

The end 14 for insertion into the handle 2 has a smaller cross-section than the end 15 for insertion into the housing 10. These parts can be secured to one another respectively by means of screw connections 17 running radially to the longitudinal axis 16.

Transition or press-fits between the handle 2 and adapter 12, on the one hand, as well as between the adapter 12 and the housing 10, on the other hand, make it possible to ensure that the parts can be fit together free of play. The adapter 12 is hollow so that cables can be guided through there.

The adapter 13 for connecting the housing 10 of the vibration device 5 to the yoke 8 also has two ends 18, 19 having different cross-sections.

The end 18 for insertion into the housing 10 has a larger cross-section than the end 19 for insertion into a rearward plug-in sleeve 20 of the yoke 8. Said parts can be secured to each other respectively by means of screw connections 21 running radially to the longitudinal axis 16.

Transition or press-fits between the housing 10 and adapter 13, on the one hand, as well as between the adapter 13 and the plug-in sleeve 20 of the yoke 8, on the other hand, make it possible to ensure that said parts can be fit together free of play.

Two pivot bearings 22, 23 are secured inside the housing 10 in the axial direction along the longitudinal axis 16 by means of O-ring seals 24, on the one hand, and secured by means of radial screws 25, on the other hand. On the upper side of the outer ring of the upper pivot bearing 22, the housing is secured, in particular screwed down, on an electric actuator in the form of an electric motor 26 in such a way that its rotary connection is accessible through the inner ring of the upper pivot bearing 22.

Located between the two pivot bearings 22, 23, is an eccentric 27, in particular in the form of a profile, on whose two end sides a bearing pin 28, 29 is respectively formed eccentrically. These two bearing pins 28, 29 are guided or mounted concentrically on the inner rings of the pivot bearings 22, 23 so that in the case of a rotation of the bearing pins 28, 29 the center of gravity of the eccentric 27 revolves around the longitudinal axis 16 and thereby generates an imbalance.

The electric motor 26 is preferably configured as a direct current motor with a nominal voltage in the order of magnitude of approx. 12 volt. Its two connections 30 run inside the housing 10, through the upper adapter 12 and further through the handle 2 upwardly to control electronics 31 arranged in the upper portion of the handle 2.

These control electronics 31 also receive two connections 32 of an accumulator pack 33, which is likewise arranged inside the handle 2. This can be a plurality of accumulators connected in series, wherein a positive pole of an accumulator is interconnected and soldered to the negative pole of the other. So that this accumulator pack 33 is not affected by vibrations triggered by the vibration device 5, it is inserted into a soft hose and, because of it, mechanically decoupled from the handle 2.

Furthermore, four wires 34, 35 run upwardly from the control electronics 31 to the grip 6, which is mounted on the upper end of the handle 2.

Figure 3:
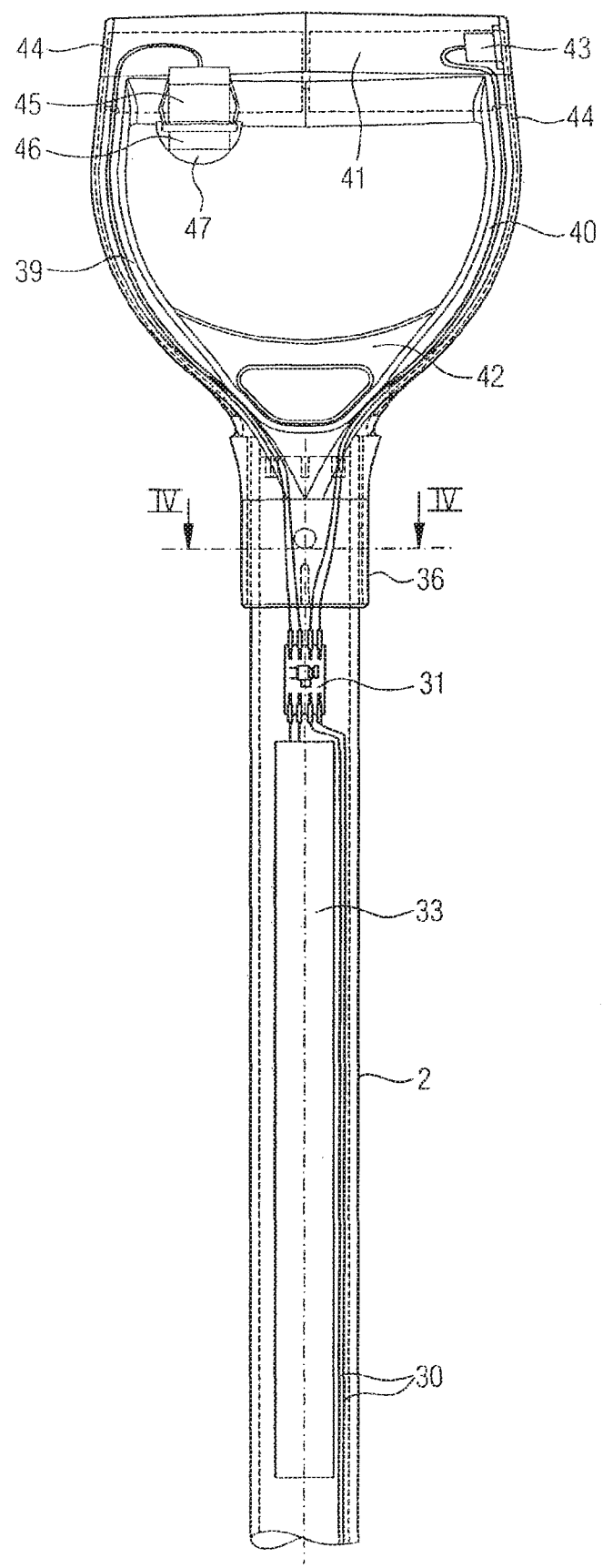
FIG. 3 The hand grip of the excrement fork from FIG. 1, likewise in an enlarged view.
Figure 4:
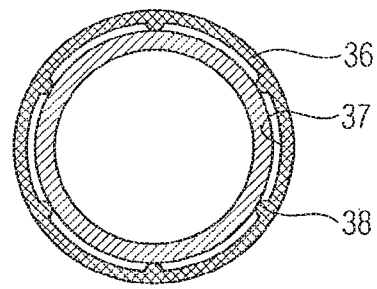
FIG. 4 A cross-sectional view of the hand grip of the excrement fork shown in FIG. 3 taken along line IV-IV, showing inwardly projecting ribs provided on the inner side of a sleeve-shaped plug connection.

FIG. 3 shows that the grip 6 has a sleeve-shaped plug connection 36 formed on its underside having a central opening into which the upper end of the handle 2 fits. In this case, FIG. 4 shows that inwardly projecting ribs 38 are provided on the inner side 37 of the sleeve-shaped plug connection 36, in particular ribs 38 running parallel to the longitudinal axis 16. The purpose of this is to minimize the contact surface between the handle 2 and the grip 6, specifically to roughly linear contacts along these ribs 38. Because of this reduced contact, the transmission of vibrations from the handle 2 to the grip 6 is likewise reduced or damped.

In FIG. 3 it is possible to see the inner structure of the grip 6 in detail:

Attached to the sleeve-shaped plug connection 36 are two diametrically opposed connecting legs 39, 40, which diverge from each other starting from the plug connection 36.

In the region of their free ends, these two connecting legs 39, 40 are connected to each other by a grip bar 41; furthermore, another connecting bridge 42 can still be provided near the plug-in sleeve 36 in order to safeguard the sleeve-shaped plug connection 36 from excessively high expanding forces. The grip bar 41 preferably has an approximately circular cross-section so that it feels good in the hand.

The two connecting legs 39, 40 are each provided with a channel to accommodate each of the wire pairs 34, 35. A first pair of wires 34 is guided therein from the control electronics 31 through a connecting leg 40 to a plug connection 43 for a charging device (not shown), which can be used to charge the accumulator pack 33. The plug connection 43 is preferably arranged on one end side 44 of the grip bar 41, countersunk in that end side 44 so that no parts can be damaged in the case of an inadvertent impact.

The second pair of wires 35 preferably leads through the other connecting leg 39 to an electromechanical actuation element 45 embedded in the grip bar 41 on the inner side thereof. Said actuation element 45 is embedded as deeply as possible in the grip bar 41 and, in addition, faces the sleeve-shaped plug connection 36 with its free actuation surface 46, i.e., is protected from damage from impacts by the adjacent connecting legs 39, 40.

It's possible to see in FIG. 3 that the actual, movable pressure-sensitive part 46 of the electromechanical actuation element 45 is protected from the environment by a rubber-elastic cover cap 47, and therefore, in particular from moisture and other chemicals.

The actuation element 45 is preferably configured as an electric push button, which completes an electrical circuit in the case of mechanical pressure on the actuation surface 46, which otherwise, i.e., without this type of mechanical pressure, is kept open, for example by a spring element or the like arranged inside the actuation element 45.

Therefore, a total of eight pairs of wires 30, 32, 34, 35 come together in the control electronics 31, specifically a first pair of wires 30 to the electric motor 26, a second pair of wires 32 to the accumulator pack 33, a third pair of wires 34 to the charging connection 43, and a fourth pair of wires 35 to the mechanical actuation element 45.

Figure 5:
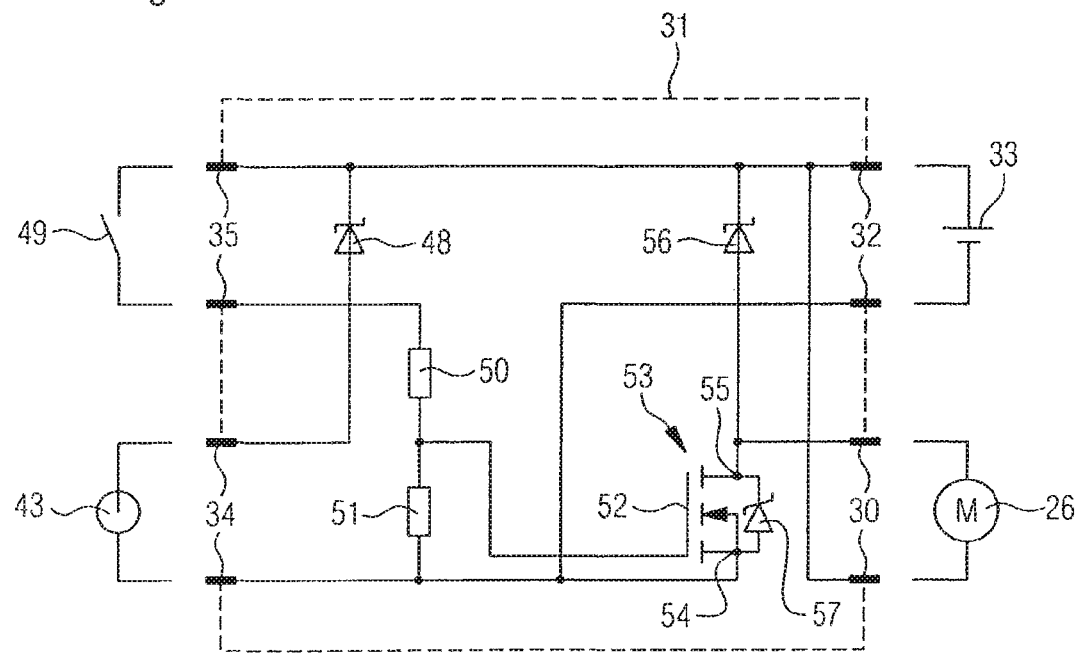
FIG. 5 A circuit diagram of the electrical devices of the excrement fork from FIG. 1.

The circuit on the control electronics 31 circuit board can be seen in FIG. 5. First of all, it shows that one wire of the pair of wires 32 to the accumulator pack 33 is connected galvanically, i.e., without any interconnected component, to one wire of the pair of wires 34 to the charging connection 43; the other wires of these two pairs of wires 32, 34 are connected with each other via a diode 48. As a result, an electrical circuit is completed between the charging connection 43 and the accumulator pack 33, which, due to the diode 48, however, permits only a current flow in a certain direction, specifically in the charging direction between the charging connection 43 and the accumulator pack 33.

As a result, the charging process begins immediately upon insertion of the charging adapter into the charging connection 43 and lasts until the accumulator pack 33 is fully charged.

The switch 49 of the electromechanical actuation element 45 is likewise attached with one its two connections directly to the accumulator pack 33, and, on the other hand, with the other connection of the accumulator pack 33 to the resistors 50, 51 via a switched-on voltage divider.

The center tap of this voltage divider between the two resistors 50, 51 is arranged with the control connection 52 of an electronic switch element 53. The electronic switch element 53 is preferably a transistor, preferably a field-effect transistor, in particular a metal oxide semiconductor transistor or metal oxide semiconductor field-effect transistor (MOSFET transistor).

The power connections 54, 55 of the electronic switch element 53 are attached between the two connections 32 of the accumulator pack 33, preferably via a diode 56 that is operated preferably in the reverse direction and connected in series with the switch element 53.

In this case, the two connections of the power converter diode 56 that are operated preferably in the reverse direction are guided out as connections 30 for the electric motor 26.

Finally, another diode 57 is attached between the two power connections 54, 55 of the electronic switch element 53, however, just like the power converter diode 56 also in reverse direction. This diode 57 forms a series circuit with the diode 56, which bridges the two connections 32 of the accumulator pack 33; in doing so, the polarity of both diodes 56, 57 is selected so that the voltage of the accumulator pack 33 cannot drive any current through these diodes 56, 57.

If the switch 49 is now closed and consequently an active triggering signal is applied via the voltage divider with the resistors 50, 51 to the control connection 52 of the electronic switch element 53, the electronic switch element 53 is shifted into the conductive state. Now current can flow through the electric motor 26.

If, on the other hand, the switch 49 is opened again, the electronic switch element 53 passes back into the blocking state in the absence of an active triggering signal on its control connection 52. Nevertheless, the motor current of the electric motor 26 must not be interrupted abruptly, but, depending on the current direction, can still decay via one of the two diodes 56, 57, as well as via the accumulator pack 33 so that over-voltages and any potential damage therefrom can be prevented.

The electronic switch element 53 ensures however that the motor current is never able to flow via the switch 49 of the electromechanical actuation element 45. The two resistors 50, 51 of the voltage divider can be dimensioned to be so high-ohmic that only a minimal current flows via the switch 49, for example in the range of a milliampere, which cannot supply an electric arc in the event the contacts are interrupted so that there is no reason to fear soot buildup on the contacts of the switch 49.

| List of Reference Numbers | |
| --- | --- |
| 1 | Fork |
| 2 | Handle |
| 3 | Tines |
| 4 | Actuation element |
| 5 | Vibration device |
| 6 | Grip |
| 7 | Grip bar |
| 8 | Yoke |
| 9 | Additional crosspiece |
| 10 | Housing |
| 11 | End side |
| 12 | Adapter |
| 13 | Adapter |
| 14 | End |
| 15 | End |
| 16 | Longitudinal axis |
| 17 | Screw connection |
| 18 | End |
| 19 | End |
| 20 | Plug-in sleeve |
| 21 | Screw connection |
| 22 | Pivot bearing |
| 23 | Pivot bearing |
| 24 | O-ring seal |
| 25 | Screw |
| 26 | Electric motor |
| 27 | Eccentric |
| 28 | Bearing pin |
| 29 | Bearing pin |
| 30 | Connections |
| 31 | Control electronics |
| 32 | Connections |
| 33 | Accumulator pack |
| 34 | Wires |
| 35 | Wires |
| 36 | Plug connection |
| 37 | Inner side |
| 38 | Ribs |
| 39 | Connecting legs |
| 40 | Connecting legs |
| 41 | Grip bar |
| 42 | Connecting bridge |
| 43 | Plug connection |
| 44 | End side |
| 45 | Actuation element |
| 46 | Actuation surface |
| 47 | Cover cap |
| 48 | Diode |
| 49 | Switch |
| 50 | Resistor |
| 51 | Resistor |
| 52 | Control connection |
| 53 | Switch element |
| 54 | Power connection |
| 55 | Power connection |
| 56 | Diode |
| 57 | Diode |

The invention claimed is:

1. A fork (1) for collecting animal excrement, or horse droppings, comprising a handle (2) and a plurality of tines (3), which, after activation of an electromechanical actuation element (4), can be set into rapid oscillation by a jiggling device (5) arranged in the handle (2) so as to separate the animal excrement from shavings and other bedding material, wherein the jiggling device (5) is driven by an electric motor (26), characterized in that a coupling between the electromechanical actuation element (4) and the jiggling device (5) has a damping behavior, and therefore allows mechanical oscillations issued from the jiggling device (5) or electric cut-in or cut-off pulses to pass onto an electromechanical switch (49) of the electromechanical actuation element (4) only in a dampened extent, wherein a) the electromechanical switch (49) of the electromechanical actuation element (4) is not arranged at the handle (2) itself, but is indirectly connected therewith, namely is arranged on a grip (6) plugged together with the upper end of the handle (2), wherein the mating surfaces facing each other, of one or two plug elements of the grip (6) on the one hand and the handle (2) on the other hand, are provided with one or a plurality of projections (38) so that only said projections (38) make contact with the other one of the two plug elements, and wherein b) the activation current of the electric motor (26) does not flow through the electromechanical switch (49) of the electromechanical actuation element (4, 45), but through a contactless electronic switch element (53), which, for the actuation thereof, is electrically coupled to the electromechanical switch (49) of the electromechanical actuation element (4).

2. The fork (1) according to claim 1, characterized in that the grip (6), which is plugged together with the upper end of the handle (2), is fixed.

3. The fork (1) according to claim 1, characterized in that the plurality of projections (38) are provided on the inner side (37) of a sleeve-shaped plug connection (36) connected to the grip (6), which projections make contact with a related surface of the handle (2), and/or vice versa.

4. The fork (1) according to claim 3, characterized in that every projection (38) is configured as an elongated protrusion, or as an elongated protrusion with a longitudinal axis parallel to the longitudinal axis (16) of the handle (2).

5. The fork (1) according to claim 1, characterized in that the grip (6) that can be fit together, or plugged together, with the handle (2) has an, in itself elongated, bar-shaped gripping region (41) extending transversely to the longitudinal axis of the handle (2).

6. The fork (1) according to claim 5, characterized in that a connecting leg (39, 40) is provided on one or both ends of the bar-shaped gripping region (41).

7. The fork (1) according to claim 6, characterized in that two free ends of the connecting legs (39, 40) that are connected to each other via the bar-shaped gripping region (41) are each connected on the free ends thereof with a sleeve-shaped plug connection (36).

8. The fork (1) according to claim 7, characterized in that a moveable part of the electromechanical actuation element (4, 45), which part is accessible from the outside, extends from the bar-shaped gripping region (41) inwardly into an interior space of an annular grip (6), where it is surrounded in a protective manner by the annular grip (6).

9. The fork (1) according to claim 8, characterized in that a moveable part (46) of the electromechanical actuation element (45), which part is accessible from the outside, is surrounded in a protective manner by a cap.

10. The fork (1) according to claim 9, characterized in that the cap (47) is clamped for fixation thereof between a body of the grip (6) and a housing of the electromechanical actuation element (4,45).

11. The fork (1) according to claim 9, wherein the cap (47) is rubber-elastic.

12. The fork (1) according to claim 6, characterized in that two free ends of the connecting legs (39, 40) that are connected to each other via the bar-shaped gripping region (41) converge towards each other from the bar-shaped gripping region (41).

13. The fork (1) according to claim 7, characterized in that the bar-shaped gripping region (41) together with the two connecting legs (39, 40) and the sleeve-shaped plug connection (36) have an annular shape.

14. The fork (1) according to claim 1, characterized in that one or a plurality of accumulators or batteries are located inside the handle (2) for supplying the electric motor of the jiggling device with power.

15. The fork (1) according to claim 14, characterized in that the accumulators can be charged via a charging device.

16. The fork (1) according to claim 15, characterized by an interface for connecting the accumulators to the charging device.

17. The fork (1) according to claim 16, characterized in that the interface is configured as a plug-in device or as a plug socket (43).

18. The fork (1) according to claim 17, characterized in that the plug-in device or the plug socket (43) is arranged on the grip (6).

19. The fork (1) according to claim 18, wherein the grip (6) can be detached from the handle (2).

20. The fork (1) according to claim 15, wherein the charging device is configured to be coupled to a power supply network.

21. The fork (1) according to claim 1, characterized in that the tines (3) of the fork (1) consist of plastic, whereas the handle (2) of the fork (1) consists of metal.

\* \* \* \* \*